Patented June 23, 1953

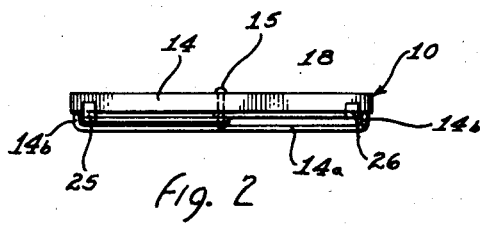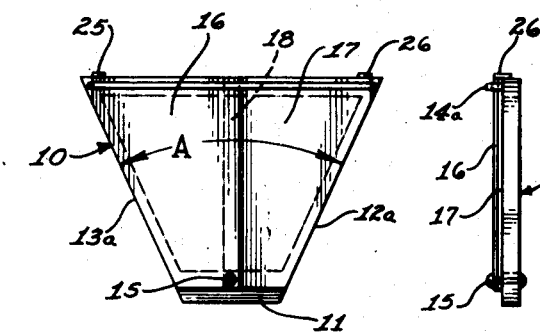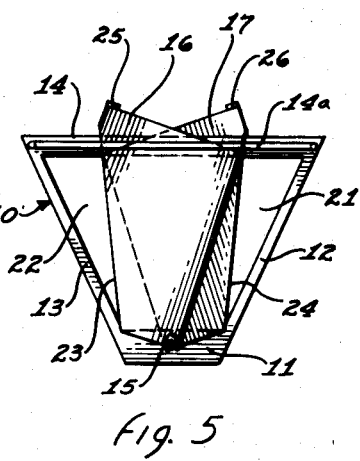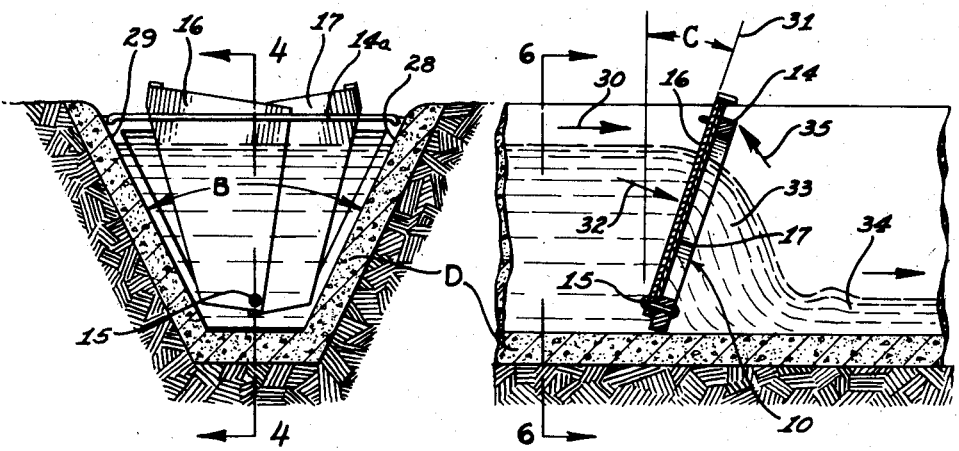

2,642,723

UNITED STATES PATENT OFFICE 2,642,723

IRRIGATION DITCH BLOCK

George Reismann, Litchfield Park, Ariz.

Application September 24, 1951, Serial No. 247,973

7 Claims. (Cl. 61—29)

This invention pertains to improvements in apparatus for controlling the flow of water in irrigation ditches and is more particularly directed to improvements in irrigation ditch block devices whereby the water level in an irrigation ditch may be controlled.

One of the objects of this invention is to provide an irrigation ditch block which is efficient in operation both in controlling the flow of water and in being highly portable and adaptable to use in any other part of an irrigation ditch for effecting a block to raise the water level in the ditch.

Still another object of this invention is to provide an irrigation ditch block readily adapted to positioning at any point along a V-shaped, trapezoidal shaped, or oblique sided ditch for restricting and controlling the flow through the ditch.

Still another object of this invention is to provide an improved V-shaped or the like irrigation ditch block which automatically locks itself in position in the V-shaped ditch by assuming an angularly disposed position from a vertical position in a predetermined relationship to the direction of force exerted by the head of water behind the ditch block.

Still another object of this invention is to provide an irrigation ditch block having adjustable gate means for regulating the flow of water in an irrigation ditch and which may be readily manually placed at any point in the ditch where it automatically maintains its position while so controlling the flow in said ditch.

Further features and advantages of this invention will appear from a detailed description of the drawings in which:

Fig. 1 is a front elevation of a typical irrigation ditch block incorporating the features of this invention.

Fig. 2 is a plan view of the irrigation ditch block shown in Fig. 1.

Fig. 3 is a right hand side elevation of the irrigation ditch block shown in Fig. 1.

Fig. 4 is a diagrammatic section through an irrigation ditch showing the ditch block in operation.

Fig. 5 is a front elevation similar to that of Fig. 1 but showing the adjustable gates in open position for flow of water through the ditch block.

Fig. 6 is a section on the line 6—6 of Fig. 4.

As illustrative of one form of the invention, there is shown an irrigation ditch block comprising a frame indicated generally at 10 consisting of a horizontal bottom member 11 and side frame members 12 and 13 which are interconnected at their upper ends by a cross member 14. Pivotally mounted about a suitable pivot pin 15 intermediate the ends of the bottom cross member 11 is a pair of adjustable gate members 16 and 17 which when swung outwardly as shown in Figs. 1, 2 and 3 totally close the area defined by the frame members 11, 12, 13 and 14. Across the front of the gate members 16 and 17 is a retaining bar 14a secured at each end by suitable inwardly extending projections 14b to the ends of the upper cross member 14 to hold the gate members in proper position on the frame during handling. The gate members 16 and 17 are also preferably arranged to overlap as at 18 and also to overlap the side frame members 12 and 13 respectively at the points 19 and 20, as best seen in Fig. 2. In this manner with the gate members 16 and 17 swung outwardly, as shown in Fig. 1, a substantially tight gate structure block is provided.

The gates 16 and 17 however may be swung toward each other toward the center of the frame structure 10 to any desired degree up to the maximum condition substantially as shown in Fig. 5 whereby discharge passageways 21 and 22 of regulatable capacity are provided for flow of water over each of the side frame members 12 and 13 and past the outside edges 23 and 24 of the gate members 16 and 17. Thus a controllable flow through the frame 10 may be readily obtained by manipulating the gate members 16 and 17 preferably through the medium of the bent over hooked ends 25 and 26 which may be grasped by the fingers or with a shovel for ready adjustment. Also it will be noted that the hooked ends 25 and 26 prevent the gate members 16 and 17 from being moved toward each other beyond the position as shown at 27 in Fig. 5 so as to prevent irregular handling and difficult manipulation of the device in transporting it from one place to another or in moving it along the irrigation ditch.

It is to be carefully noted that the angularity of the edges 12a and 13a of the side frame members 12 and 13 as defined by the angle A is somewhat more acute than the angle B, Fig. 6, of the side walls 28 and 29 of the irrigation ditch D. Thus when the unit or block is placed into the irrigation ditch D it will lean backwardly away from the direction of water flow indicated by the arrow 30 by an angle C which angle is so proportioned that the angle of rest indicated by the line 31, Fig. 4, will be substantially normal to the direction of resultant water pressure indicated by the arrow 32. Thus the trapezoidal shaped block commonly called a "V shaped" ditch block will be automatically rigidly locked into the sides of the V shaped irrigation ditch at any point where it is inserted and allowed to swing back to the angle C. When in such position as shown in Fig. 4 the gate means 16 and 17 may be readily adjusted to any desired amount to allow a bypass flow of water such as 33 into the down stream portion 34 of the irrigation ditch or to substantially cut off all flow by closing the gates 16 and 17 to the position shown in Fig. 1. Further, the block may be easily removed from the irrigation ditch by merely pulling it upwardly by hand or by grasping the top member 14 of the frame with a shovel at the point indicated by the arrow 35 in Fig. 4 and released from the ditch. Should water pressure be too great to make this operation easy with the gates 16 and 17 totally closed they may be momentarily opened thus releasing most of the pressure which might otherwise hinder removal of the device to another location. It is also practical with this structure to exert a moderate pressure at the point 35 just sufficient to relieve the side wedging action of the members 12 and 13 in the sides 28 and 29 of the ditch so that the water will automatically move the gate down to another location where it may be released and again fall in to locked position as shown in Fig. 4.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed is:

1. An irrigation ditch block comprising, a rigid frame structure having, a horizontal bottom member, a pair of obliquely disposed side members connected at their bottom ends to said bottom member, and a horizontally disposed top tie member connected to the top ends of said obliquely disposed side member forming an opening symmetrical with and slightly smaller than the cross section of said ditch where engaged by said block, and a pair of laterally swinging adjustable flow control gates pivotally mounted at their lower ends at the midpoint of said lower horizontal member so as to provide flow controlled openings between said gates and said oblique side members.

2. An irrigation ditch block comprising, a rigid frame, a bottom horizontal member for engaging the bottom of a V-shaped irrigation ditch, a pair of angularly disposed oblique side members having outer edges engaging the side walls of said irrigation ditch connected at their lower ends to said bottom member, a top cross member interconnecting the upper ends of said angularly disposed members, a pair of gates pivotally mounted at their lower ends about a common point intermediate the ends of said lower horizontal member having outer edges movable relative to the inner edges of said oblique side members, and means for swinging said gates to any desired adjusted position in said frame to provide a controlled passageway between the inner edges of said oblique side members and the outer edges of said gates.

3. An irrigation ditch block comprising, a rigid frame, a bottom horizontal member for engaging the bottom of a V-shaped irrigation ditch, a pair of angularly disposed oblique side members having outer edges engaging the side walls of said irrigation ditch connected at their lower ends to said bottom member, a top cross member interconnecting the upper ends of said angularly disposed members, a pair of gates pivotally mounted at their lower ends about a common point intermediate the ends of said lower horizontal member having outer edges movable relative to the inner edges of said oblique side members, means for swinging said gates to any desired adjusted position in said frame to provide a controlled passageway between the inner edges of said oblique side members and the outer edges of said gates, retaining bar means secured to the upper ends of said angularly disposed members and passing in front of said gate members on the opposite side thereof from said upper transverse member, and turned in end portions on said retaining bar means to limit the outward swinging movement of said gate means to fully closed position.

4. An irrigation ditch block comprising, a rigid frame, a bottom horizontal member for engaging the bottom of a V-shaped irrigation ditch, a pair of angularly disposed oblique side members having outer edges engaging the side walls of said irrigation ditch connected at their lower ends to said bottom member, a top cross member interconnecting the upper ends of said angularly disposed members, a pair of gates pivotally mounted at their lower ends about a common point intermediate the ends of said lower horizontal member having outer edges movable relative to the inner edges of said oblique side members, means for swinging said gates to any desired adjusted position in said frame to provide a controlled passageway between the inner edges of said oblique side members and the outer edges of said gates, retaining bar means secured to the upper ends of said angularly disposed members and passing in front of said gate members on the opposite side thereof from said upper transverse member, turned in end portions on said retaining bar means to limit the outward swinging movement of said gate means to fully closed position, and further stop and actuating means on the outer corners of said gate means for manipulating said gates on said pivotal mounting and for limiting the swinging of said gates toward each other to open position of said irrigation ditch block.

5. An irrigation ditch block comprising a V-shaped frame member of similar cross section to the irrigation ditch to be blocked, oblique side frame members on said block disposed at a more acute angle than the angle of the sides of said ditch, laterally horizontally movable gate means carried in said frame for regulating the opening through said frame, means for pivotally mounting said gate means on the bottom portion of said V-shaped frame, and retaining means interconnecting the upper ends of the oblique angularly disposed side portions of said frame for limiting the movement of said gate means.

6. An irrigation ditch block adapted for use with trapezoidal shaped irrigation ditches comprising, a horizontally disposed bottom member engaging the bottom of said ditch, a pair of obliquely disposed side members rigidly secured to said bottom member at an angle slightly more acute than the angle between the sides of said irrigation ditch, an upper transverse member secured to the upper ends of said obliquely disposed side members, a pair of trapezoidal shaped gate members pivotally mounted at one of their corners around a common pivot point at the midpoint of said horizontal bottom member.

7. An irrigation ditch block adapted for use with trapezoidal shaped irrigation ditches comprising, a horizontally disposed bottom member engaging the bottom of said ditch, a pair of obliquely disposed side members rigidly secured to said bottom member at an angle slightly more acute than the angle between the sides of said irrigation ditch, an upper transverse member secured to the upper ends of said obliquely disposed side members, a pair of trapezoidal shaped gate members pivotally mounted at one of their corners around a common pivot point at the midpoint of said horizontal bottom member, stop and retaining means associated with said upper transverse member for limiting the swinging motion of said gate members toward closed position of said ditch block.

GEORGE REISMANN.

References Cited in the file of this patent

UNITED STATES PATENTS

| Number | Name | Date |
|---|---|---|
| 674,314 | Johnson | May 14, 1901 |
| 1,370,296 | Edwards | Mar. 1, 1921 |